2,770,585

PURIFICATION OF ACIDS CONTAINING 2 TO 6 CARBON ATOMS

Eldred T. Smith and Alexander F. MacLean, Corpus Christi, Tex., assignors to Celanese Corporation of America, New York, N. Y., a corporation of Delaware No Drawing. Application July 2, 1952,
Serial No. 296,936

14 Claims. (Cl. 202—59)

This invention relates to a process for the purification of lower fatty acids and relates more particularly to a process for the removal of formic acid from a mixture containing formic acid and a lower fatty acid.

It is an object of our invention to provide a novel process for the removal of formic acid from a mixture of organic compounds containing formic acid and another a lower fatty acid.

Another object of our invention is the provision of an efficient and economical process for the recovery of substantially pure acetic acid from a mixture containing acetic acid, formic acid and higher boiling compounds such as propionic acid.

Other objects of this invention will appear from the following detailed description.

Various processes are used for the production of acetic acid. In several of these processes, such as those involving the vapor phase or liquid phase partial oxidation of hydrocarbons, the acetic acid produced contains small amounts of formic acid as an impurity, with or without higher boiling impurities such as propionic acid, butyric acid, succinic acid and glycol esters.

We have now found that acetic acid may be purified by removing the formic acid present therein by treating the mixture with acetic anhydride. The acetic anhydride reacts with the formic acid to produce carbon monoxide and acetic acid. This method results in substantially complete removal of the formic acid without loss of acetic acid.

The process of our invention is also applicable to the removal of formic acid from other lower fatty acids or mixtures of such fatty acids. For example, formic acid may be removed from a mixture containing a major amount of propionic, butyric, valeric or caproic acid by treating such a mixture with the corresponding anhydride, i. e. propionic, butyric, valeric or caproic, anhydride.

In a particular embodiment of our invention impure acetic acid, i. e. acetic acid containing formic acid, is fed continuously to a distillation column equipped with a reboiler and a condenser. Desirably the impure acetic acid is fed into the column at a point in the central portion thereof, that is, at a point in the portion above the bottom and below the top of the column. Acetic anhydride is fed continuously into the column, preferably at a point above the point of introduction of the impure acetic acid. At the start of the process a catalyst for the reaction is placed in the reboiler together with some acetic anhydride. During the process part of the material is removed continuously from the reboiler and introduced into the column at a point above the point where the impure acetic acid is fed into the column, preferably at the point where the acetic anhydride feed enters the column. Substantially pure acetic acid is taken off overhead from the condenser. The other product of the reaction, carbon monoxide gas, passes out uncondensed from the condenser to an outside vent. When the impure acetic acid feed contains higher boiling compounds, such as propionic acid, butyric acid or glycol esters, and it is desired to remove these compounds also, they may be withdrawn, batchwise or continuously, from the base of the column as they accumulate, together with some of the catalyst; fresh catalyst is added to make up for the catalyst so removed.

The process of our invention may be operated with or without a catalyst. Preferred catalysts are tertiary amines, such as pyridine and triethyl amine, and salts of acetic acid, such as sodium acetate, potassium acetate, magnesium acetate and calcium acetate. These catalysts are present in the reaction medium as ionized acetic acid or other fatty acid salts and have no tendency to be distilled over with the acetic acid. The amount of catalyst may be varied considerably, an increase in the concentration of catalyst causing an increase in the rapidity of the reaction. However, in actual practice very little catalyst is necessary for rapid reaction. Excellent results have been obtained with a concentration of 0.125 mole of catalyst, such as pyridine or sodium acetate, per liter of reaction mixture.

For complete removal of the formic acid, the amount of anhydride, such as acetic anhydride in the case of acetic acid, should be at least about one mole per mole of formic acid present. A slight excess of anhydride is desirable, e. g. the use of 1.2 moles of the anhydride per mole of formic acid. A large excess is not harmful but merely adds to the expense of operation.

In our preferred process, the reaction takes place at the temperature of operation of the distillation column, e. g. about 115 to 125° C. for acetic acid. However, lower or higher reaction temperatures may be employed if desired, e. g. temperatures within the range of 50 to 150° C.

While we operate at atmospheric pressure in our preferred embodiment, the process may also be conducted under superatmospheric pressures, with higher distillation temperatures, or at subatmospheric pressures, with lower distillation temperatures.

For optimum results the feed of impure acetic acid or other lower fatty acid should be dry, containing no more than 1.0%, preferably no more than 0.2% of water. Any water present reacts with the anhydride to produce the corresponding acid.

The concentration of the formic acid in the impure mixture being treated may vary widely. For example, very good results have been obtained when the impure mixtures contain 0.5 to 10% of formic acid.

In order further to illustrate our invention but without being limited thereto, the following examples are given:

*Example I*

For carrying out the process there is employed a perforated plate distillation column having three sections, a 5 tray top section, a 15 tray middle section and a 5 tray bottom section. The column is fitted at the top with a water-cooled condenser head having a reflux line, and at the bottom with a thermosiphon reboiler. Dry acetic acid containing 4.5% by weight of formic acid is fed in continuously onto the bottom tray of the 15 tray middle section and acetic anhydride is fed in continuously onto the top tray of this middle section. A pipe is provided for recycling, by pumping, the contents of the reboiler into the entering stream of acetic anhydride. At the beginning of the process a mixture of 5% by weight of pyridine and 95% by weight of acetic anhydride are placed in the reboiler. The reboiler is maintained at a temperature of 125–130° C. and the middle section at a temperature of about 120° C. Purified acetic acid is taken off overhead and condensed in the condenser. Part of the condensed acetic acid is allowed to return as reflux to the top of the column and the remainder is removed as distillate. The velocities of the streams are regulated so that 1.2 moles of acetic anhydride per mole of formic acid are fed to the middle section, which contains 0.0125 mole of pyridine per liter of reaction mixture. Specifically, the impure acetic acid is fed in at a rate providing 208 moles of acetic acid and 15 moles of formic acid per hour; the acetic anhydride is fed in at a rate providing 15 moles of acetic anhydride per hour; the contents of the reboiler are recycled at a rate providing 3 moles of acetic anhydride, 0.16 mole of pyridine and 2.5 moles of acetic acid per hour. 230 moles of substantially pure acetic acid are removed as distillate. 10 moles per hour of substantially pure acetic acid are returned to the column as reflux.

*Example II*

Example I was repeated with the exception that sodium acetate was substituted, mole for mole, for the pyridine. The results were substantially the same.

It is to be understood that the foregoing detailed description is given merely by way of illustration and that many variations may be made therein without departing from the spirit of our invention.

Having described our invention, what we desire to secure by Letters Patent is:

We claim:

1. Process for the removal of formic acid from a mixture containing formic and acetic acids, which comprises passing said mixture into a distillation column, introducing acetic anhydride into said column at a point above the point of introduction of said mixture whereby the acetic anhydride will react with the formic acid to produce carbon monoxide and acetic acid and distilling acetic acid from the top of said column, there being present in the reaction mixture insufficient water to prevent the reaction between the acetic anhydride and the formic acid.

2. Process for the removal of formic acid from a mixture containing formic and acetic acids, which comprises passing said mixture into the central portion of a distillation column introducing acetic anhydride into the central portion of said column at a point above the point of introduction of said mixture whereby the acetic anhydride will react with the formic acid to produce carbon monoxide and acetic acid and distilling acetic acid from the top of said column, there being present in the reaction mixture insufficient water to prevent the reaction between the acetic anhydride and the formic acid.

3. Process for the removal of formic acid from a mixture containing formic and acetic acids, which comprises passing said mixture into a distillation column, introducing acetic anhydride into said column at a point above the point of introduction of said mixture whereby the acetic anhydride will react with the formic acid to produce carbon monoxide and acetic acid, distilling acetic acid from the top of said column and recycling acetic anhydride and acetic acid from a point below the point of introduction of said mixture to a point in said column above the point of introduction of said mixture, there being present in the reaction mixture insufficient water to prevent the reaction between the acetic anhydride and the formic acid.

4. Process for the removal of formic acid from a mixture containing formic and acetic acids, which comprises passing said mixture into the central portion of a distillation column containing a basic catalyst for the reaction of formic acid and acetic anhydride, introducing a feed containing acetic anhydride into the central portion of said column at a point above the point of introduction of said mixture whereby the acetic anhydride will react with the formic acid to produce carbon monoxide and acetic acid, distilling acetic acid from the top of said column, collecting a blend containing acetic acid, acetic anhydride and catalyst at a point below the point of introduction of said mixture and mixing at least a part of said collected blend with said feed containing acetic anhydride, there being present in the reaction mixture insufficient water to prevent the reaction between the acetic anhydride and the formic acid.

5. Process for the removal of formic acid from a mixture containing formic and acetic acids, which comprises passing said mixture into the central portion of a distillation column containing pyridine, introducing a feed containing acetic anhydride into the central portion of said column at a point above the point of introduction of said mixture whereby the acetic anhydride will react with the formic acid to produce carbon monoxide and acetic acid, distilling acetic acid from the top of said column, collecting a blend containing acetic acid, acetic anhydride and pyridine at a point below the point of introduction of said mixture and mixing at least a part of said collected blend with said feed containing acetic anhydride, there being present in the reaction mixture insufficient water to prevent the reaction between the acetic anhydride and the formic acid.

6. Process for the removal of formic acid from a mixture containing formic and acetic acids, which comprises passing said mixture into the central portion of a distillation column containing sodium acetate, introducing a feed containing acetic anhydride into the central portion of said column at a point above the point of introduction of said mixture whereby the acetic anhydride will react with the formic acid to produce carbon monoxide and acetic acid, distilling acetic acid from the top of said column, collecting a blend containing acetic acid, acetic anhydride and sodium acetate at a point below the point of introduction of said mixture and mixing at least a part of said collected blend with said feed containing acetic anhydride, there being present in the reaction mixture insufficient water to prevent the reaction between the acetic anhydride and the formic acid.

7. Process for the removal of formic acid from a mixture comprising principally a lower fatty acid containing from 2 to 6 carbon atoms and containing up to 10% of formic acid, which process comprises adding to said mixture the anhydride of said lower fatty acid, reacting said anhydride with the formic acid in said mixture to produce carbon monoxide and said lower fatty acid, and distilling said lower fatty acid, there being present in the reaction mixture insufficient water to prevent the reaction between the anhydride and the formic acid.

8. Process for the removal of formic acid from a mixture comprising principally acetic acid and containing up to 10% of formic acid and no more than 1% by weight of water, which process comprises adding acetic anhydride to said mixture, reacting said anhydride with the formic acid in said mixture to produce carbon monoxide and acetic acid and distilling the acetic acid.

9. Process for the removal of formic acid from a mixture comprising principally a lower fatty acid containing from 2 to 6 carbon atoms and containing up to 10% of formic acid, which process comprises adding to said mixture the anhydride of said lower fatty acid, reacting said anhydride with the formic acid in said mixture at about the boiling point of said mixture to produce carbon monoxide and said lower fatty acid, and distilling said lower fatty acid, there being present in the reaction mixture insufficient water to prevent the reaction between the anhydride and the formic acid.

10. Process for the removal of formic acid from a mixture comprising principally acetic acid and containing up to 10% of formic acid and no more than 1% by weight of water, which process comprises adding acetic anhydride to said mixture, reacting said anhydride with the formic acid in said mixture at about 50 to 150° C. to produce carbon monoxide and acetic acid and distilling the acetic acid.

11. Process for the removal of formic acid from a mixture comprising principally acetic acid and containing up to 10% of formic acid and no more than 1% by weight of water, which process comprises adding acetic anhydride to said mixture, reacting said anhydride with the formic acid in said mixture in the presence of a catalyst to produce carbon monoxide and acetic acid and distilling the acetic acid.

12. Process for the removal of formic acid from a mixture comprising principally a lower fatty acid containing from 2 to 6 carbon atoms and containing up to 10% of formic acid, which process comprises adding to said mixture the anhydride of said lower fatty acid, reacting said anhydride with the formic acid in said mixture to produce carbon monoxide and said lower fatty acid while distilling off said lower fatty acid, there being present in the reaction mixture insufficient water to prevent the reaction between the anhydride and the formic acid.

13. Process for the removal of formic acid from a mixture comprising principally acetic acid and containing up to 10% of formic acid and no more than 1% by weight of water, which process comprises adding acetic anhydride to said mixture, reacting said anhydride with the formic acid in said mixture to produce carbon monoxide and acetic acid while distilling off the acetic acid.

14. Process for the removal of formic acid from a mixture comprising principally acetic acid and containing up to 10% of formic acid and no more than 1% by weight of water, which process comprises passing said mixture into the central portion of a distilling column containing a basic catalyst for the reaction of formic acid and acetic anhydride, said basic catalyst being selected from the group consisting of the basic metal salts of acetic acid and the salts of acetic acid with tertiary amines, introducing a feed containing acetic anhydride into the central portion of said column at a point above the point of introduction of said mixture whereby the acetic anhydride will react with the formic acid to produce carbon monoxide and acetic acid, distilling acetic acid from the top of said column, collecting a blend containing acetic acid, acetic anhydride and said catalyst at a point below the point of introduction of said mixture and mixing at least a part of said collected blend with said feed containing acetic anhydride.

References Cited in the file of this patent

UNITED STATES PATENTS

| | | |
|---|---|---|
| 648,580 | Behal | May 1, 1900 |
| 1,210,792 | Gorhan | Jan. 2, 1917 |

FOREIGN PATENTS

| | | |
|---|---|---|
| 113,165 | Germany | Aug. 7, 1900 |